United States Patent [19]

Greenwood

[11] 4,016,354
[45] Apr. 5, 1977

[54] PREPARATION OF PHARMACOLOGICALLY ACTIVE HYDROXYALKYL STARCH

[75] Inventor: Charles Trevour Greenwood, Watford, England

[73] Assignee: The United States of America as represented by the Secretary of the Navy, Washington, D.C.

[22] Filed: Oct. 6, 1975

[21] Appl. No.: 620,001

[30] Foreign Application Priority Data

Oct. 7, 1974 United Kingdom ............ 43391/74

[52] U.S. Cl. .............................................. 536/111
[51] Int. Cl.$^2$ ......................................... C08B 31/08
[58] Field of Search ................. 536/111; 260/233.3

[56] References Cited

UNITED STATES PATENTS 3,523,938  8/1970  Hershenson et al. ....... 260/233.3 R
3,890,300  6/1975  Huchette et al. ........... 260/233.3 R Primary Examiner—Melvyn I. Marquis
Attorney, Agent, or Firm—R. S. Sciascia; A. L. Branning; P. J. Hagan

[57] ABSTRACT

Hydroxyalkyl starch having utility as a cryoprotective agent for human erythrocytes and as a plasma volume expander is prepared by the steps of subjecting a waxy starch to acid hydrolysis at a temperature below the gelatinization temperature of the starch to effect a molecular size reduction while substantially retaining the granular form of the starch, reacting the hydrolyzed starch with a reducing agent under reaction conditions which prevent the dissolution of the granular starch, suspending the stabilized, hydrolyzed starch in a liquid medium comprising a water-miscible organic solvent, in which medium the hydrolyzed starch is substantially insoluble, reacting the stabilized, hydrolyzed starch in suspension with a starch hydroxyalkylating agent under basic pH conditions until a hydroxyalkylated starch having a molecular substitution within the range from about 0.3 to 0.9 is obtained. The granular form of the starch is retained throughout the process.

10 Claims, No Drawings

PREPARATION OF PHARMACOLOGICALLY ACTIVE HYDROXYALKYL STARCH

BACKGROUND OF THE INVENTION

The present invention generally relates to a process for the preparation of hydroxyalkyl starch, and more particularly to the preparation of hydroxyethyl starch having utility as a cryoprotective agent for human erythrocytes.

Hydroxyethyl starch (HES), prepared by the reaction of starch with ethylene oxide, is readily water soluble and, in contrast to native starch, aqueous solutions are stable over prolonged periods. These properties, together with the low cost of manufacture have led to its extensive use as an industrial chemical.

In commerical practice, hydroxyalkyl starch is prepared by the reaction of alkylene oxides with starch, often in the presence of catalysts such as inorganic salts, inorganic alkalis, and certain organic bases. Reaction systems have been designed to produce an essentially granular product by inhibition of gelation, by limiting the amount of water present in the reaction system, by the addition of inorganic salts, or by carrying out the reaction in certain alcoholic media. Many of these methods are disclosed in U.S. Pat. Nos. 2,516,632, 2,516,633, 2,516,634 and 2,845,417 to Kesler and Hjermstad.

In the last decade considerable interest has been shown in the pharmacological properties of HES as a blood plasma volume expander. See, for example, U.S. Pat. No. 3,523,938.

More recently, research has been undertaken to develop cryoprotective agents suitable for use in processes for the long-term, large volume storage of blood through freezing. It has been found that to prevent extensive haemolysis of the blood cells during the freezing and thawing procedures, it is necessary to mix the erythrocytes with a cryoprotective agent. Dimethyl sulphoxide and glycerol have been proven to be effective cryoprotective agents. They act by an intracellular mechanism so that when the erythrocytes are thawed and prepared for transfusion into a patient, it is necessary to carry out a treatment of the cells which removes these protective agents from within the cells.

Polyvinyl pyrrolidone and hydroxyethyl starch (HES) have also-been investigated as cryoprotective agents. Both of these substances work by an extracellular mechanism and hydroxyethyl starch has the advantage that it can be transfused, if desired, together with the erythrocytes so that no separation of the cryoprotective agent from the cells is necessary before use. See, for example, U.S. Pat. No. 3,758,382.

The hydroxyalkyl starch used as a plasma volume extender and as a cryoprotective agent for human erythrocytes is prepared from a so-called waxy starch. The reason for the choice of a hydroxyalkyl derivative of waxy starch as an artificial colloidal agent is that waxy starch is made up primarily of amylopectin and little or no amylose. Amylopectin, the branched component of starch, is very similar in structure to glycogen, the reserve polysaccharide of animals. Due to this similarity it was concluded that a hydroxyalkyl derivative of amylopectin should be compatible with body tissue, and more resistant to the highly-specific enzyme systems which attack it. Waxy starch can be obtained from genetic varieties of maize, sorghum, rice and barley.

One process which has been developed for the production of HES which is suitable as a cryoprotective agent for human erythrocytes is described by T. J. Schoch in the paper "Preparation and Characterization of Hydroxyethyl Starch" in the Proceedings of the Third Conference on Artificial Colloidal Agents, National Academy of Sciences, National Research Council, Washington, D.C., (1965).

The process comprises:

i. a preliminary alkali treatment with aqueous sodium hydroxide to reduce the content of protein and natural pigments in the granular starting material, ii. acid hydrolysis with dilute hydrochloric acid to reduce the molecular size of the starch so that an aqueous solution of the final product has the desired viscosity and osmotic pressure.

iii. dissolution of the hydrolyzed starch granules in aqueous sodium hydroxide, iv. treatment of the resulting solution with ethylene oxide which reacts with free hydroxyl groups of the hydrolysed starch to form hydroxyethyl groups (without this partial conversion of some of the free hydroxyl groups, the hydrolyzed starch would be too readily broken down by blood amylase and would be excreted from the body before their full effect as a blood volume extender was utilized), the molar substitution, i.e. the numbers of hydroxyethyl ether groups per anhydroglucose unit in the starch, being from 0.7 to 0.9, v. carbon treatment to remove residual colour, vi. filtration to remove haze and particulate material, vii. spray-drying to give a dry white product, viii. acetone extraction to remove by-product glycols formed in the hydroxyethylation step, and ix. drying to remove acetone.

It can be seen that the process is lengthy and, when operated on a commercial scale, requires a considerable amount of equipment. The product obtained also suffers from the disadvantage that it contains a significant amount of inorganic salts as an impurity. Figures of 2.84 and 2.75% for the ash content, calculated as NaCl, are quoted in the Schoch paper referred to above and figures of 1.20 and 2.03% NaCl are quoted by a commercial supplier who is believed to produce HES according to the process described in the Schoch paper.

The presence of such a proportion of inorganic salts in hydroxyethyl starch is disadvantageous because it precludes the use of reversible agglomeration as a method of post-thaw processing of human erythrocytes when the hydroxyethyl starch is used as a cryoprotective agent.

SUMMARY OF THE INVENTION

Accordingly, an object of the present invention is to provide an improved process for preparing hydroxyalkyl starch.

Another object of the present invention is to provide a process for preparing hydroxyalkyl starch which is suitable as a cryoprotective agent for human erythrocytes.

It is also an object of the present invention to provide a process for preparing hydroxyalkyl starch which is suitable as a plasma volume expander.

It is a further object of this invention to provide an economical process for preparing an inorganic salt free, colorless, hydroxyalkyl starch which has valuable pharmacological properties.

Yet another object of this invention is to provide inorganic salt free, colorless, hydroxyalkyl starch derivatives having pharmacological activity.

These and other objects are accomplished by providing a process for the preparation of hydroxyalkyl starch by the steps of subjecting a waxy starch to acid hydrolysis at a temperature below the gelantinization temperature of the starch to effect a molecular size reduction while substantially retaining the granular form of the starch, reacting the hydrolyzed starch with a reducing agent under reaction conditions which prevent the dissolution of the granular starch, suspending the stabilized, hydrolyzed starch in a liquid medium comprising a water-miscible organic solvent, in which medium the hydrolyzed starch is substantially insoluble, reacting the stabilized, hydrolyzed starch in suspension with a starch hydroxyalkylating agent under basic pH conditions until a hydroxyalkylated starch having a molecular substitution within the range from about 0.3 to about 0.9 is obtained. The granular form of the starch is retained throughout the process.

DESCRIPTION OF THE PREFERRED EMBODIMENT

We have now developed a simple process for the production of hydroxyethyl starch suitable for use as a cryoprotective agent in the freezing of human erythrocytes and as a plasman volume expander and which is substantially free from inorganic salts.

The process we have developed is essentially based upon retaining the granular form of the starch throughout the process, that is through acid hydrolysis and hydroxyethylation steps, so that water-soluble impurities and by-products, such as inorganic salts and the glycols formed during hydroxyethylation, can readily be removed by washing and separation of the solid particulate material by, for example, centrifugation. By this means steps (iii), (v), (vi) and (vii) of the process described by Schoch are no longer necessary and, in addition, an inorganic salt-free product is obtained.

Our process, therefore, comprises subjecting waxy starch to acid hydrolysis at a temperature below the gelatinization temperature of the starch to effect the desired molecular size reduction while substantially retaining the granular form of the starch, suspending the hydrolyzed starch in a liquid medium comprising a water-miscible organic solvent, in which medium the hydrolyzed starch is substantially insoluble, treating the hydrolyzed starch in the suspension with ethylene oxide in order to obtain a molar substitution of from 0.3 to 0.9, preferably from 0.7 to 0.8, and separating, washing and drying the resulting product.

For waxy maize starch, for example, the gelatinization temperature is approximately 55° C, so that the acid hydrolysis step should be carried out at a lower temperature than this, preferably at 50° C. The degree of molecular size reduction, and hence the viscosity of aqueous solutions of the final product, can be controlled by suitable choice of the strength and type of acid used and by the reaction time; and suitable hydrolysis conditions to obtain a particular desired viscosity can readily be determined by preliminary experiment. Most acids can be used to effect the hydrolysis, hydrochloric acid being preferred because it is both convenient and rapid in achieving the desired effect.

The hydroxyethylation is carried out in a water-miscible organic solvent-containing medium in which the hydrolyzed starch is insoluble. A wide range of organic solvents and mixtures of organic solvents and water can be used. Mixtures of a major proportion of isopropanol and a minor proportion of water are preferred. The molar substitution in the product obtained can be controlled by the amount of ethylene oxide used. It is preferred to add the ethylene oxide to the reaction mixture with the reaction mixture and the ethylene oxide at a temperature below 5° C, preferably at 2° C, since at such temperatures ethylene oxide is a liquid and, therefore, easier to handle. After completion of ethylene oxide addition, the reaction vessel may be sealed and the reaction then carried out at a higher temperature, for example 37° C.

In a modification of the process according to the invention, a stabilization reaction step is carried out between the acid hydrolysis and hydroxyethylation steps. This stabilization reaction is also carried out in such a way as to maintain the granular form of the material.

The glycosidic bonds hydrolyzed by acid treatment yield new, labile reducing end-groups. Such groups are decomposed when concentrated solutions of the final product are autoclaved for long periods or if they are exposed to alkaline conditions (as the material is, for example, in steps (iii) and (iv) of the process described by Schoch).

The stabilization reaction comprises reacting the hydrolyzed starch with reducing agent to reduce the aldehydic reducing groups to the corresponding alcohol groups. Sodium borohydride is the preferred reducing agent since it readily reduces aldehydic groups. Since sodium borohydride readily decomposes in water to produce an alkaline solution which would slowly dissolve granular starch, it is necessary to carry out the borohydride reduction sufficiently rapidly that at least 70%, and preferably at least 80%, of the starch remains in the granular form. The necessary rapidity of reaction can, for example, be obtained by carrying out the reaction with a 10% w/v slurry of the hydrolyzed starch in water at a temperature of 48° – 50° C, to which sodium borohydride is added rapidly to a final concentration of 1% w/v and then stopping the reaction after 5 minutes by the cautious addition of glacial acetic acid.

After this reduction step, the starch is generally found to have less than 10% of the reducing power of the acid hydrolyzed material and to be stable to alkali.

The hydroxyethyl starch obtained when this stabilization reaction is carried out before hydroxyethylation is a novel product and constitutes a further aspect of the present invention.

Microscopic examination of hydroxyethyl starch powders produced in accordance with the invention, with the powders mounted in alcohol, show that much of the original granular form and birefringence properties are retained. The granular size-distribution is hardly changed by the hydroxyethylation. However, it is known that granular swelling occurs during the hydroxyethylation step and the subsequent contraction of the granules on working with non-aqueous solvents is revealed as surface wrinkles and abnormalities which are seen when the samples are examined in a scanning electron microscope.

When placed in cold water, the hydroxyethyl starch produced in accordance with the invention, immediately gelatinizes and eventually disperses into solution. 10% Aqueous solutions of this hydroxyethyl starch are stable at 4° C and at room temperature for periods in excess of several weeks.

In order that the invention may be more fully understood, the following example is given by way of illustration only:

EXAMPLE

(a) Acid hydrolysis

To waxy maize starch (1.2 Kg), dilute hydrochloric acid (4.0 liters, 2M; prewarmed to 50° C) was added and the resulting starch slurry was held at 50° C. with efficient stirring. After the desired reaction time (found by preliminary experimentation to be in the range 2–4 h depending on the final viscosity required), the starch-acid slurry was rapidly cooled to about 15° C by passage through a water-cooled heat exchanger. The slurry was then neutralized by the addition of solid sodium bicarbonate.

Small quantities of dark-coloured material formed in side-reactions were readily removed by differential centrifugation of the hydrolyzed starch in water. The hydrolyzed starch was slurried in distilled water (at about 30% solids), then centrifuged (M.S.E. "major"; 1500 rpm, 15 min.); the impurities separated as brown-coloured surface layer on the sedimented starch and this layer was readily removed with a spatula. Repetition of this procedure yielded white granular starch, which was then washed with distilled water to remove residual salts, and air dried, or transferred as a slurry in water to the stabilization step.

(b) Stabilization step

The acid hydrolyzed starch was slurried in distilled water to a concentration of about 10% w/v and the slurry was equilibrated to 48° – 50° C. Sodium borohydride was added rapidly to a final concentration of 1% w/v. The reaction was allowed to proceed for 5 minutes before it was stopped by the cautious addition of glacial acetic acid. A very small quantity of flocculent grey impurity (< 0.1%) was removed at this stage by filtration through a loosely-packed glass fibre. The white granular starch was washed with copious quantities of distilled water on a suction filter, and then dried, if desired after washing with acetone, or in air.

(c) Hydroxyethylation

Dry, acid-hydrolyzed stabilized starch (390g) was slurried with distilled water (55 ml), isopropanol (350g), and sodium hydroxide (10g) in a conical flask sealed with a ground-glass stopper. After stirring the suspension, by a magnetic stirred, for about 1 hour at room temperature, the reaction mixture was cooled to about 2° C. Ethylene oxide at 2° C (100 ml) was then added, the flask was sealed, and placed in an incubator at 37° C for 24 hours with stirring for the first 2 hours. The reaction was terminated by the addition of glacial acetic acid. Excess glacial acetic acid was removed on a suction filter, and the product washed with isopropanol (500 ml). Residual glycols and sodium acetate formed as by-products of the reaction were removed by batch washing with aqueous acetone (95% v/v; 3 × 2 liters) and aqueous ethanol 75% v/v; 3 × 2 liters), respectively. The final product had a molar substitution of 0.71.

The properties of the final product obtained, are set forth in Table I.

Samples A, B and C were produced similarly according to the present invention except that the stabilisation step was omitted in the production of samples B and C, and Sample B had a higher viscosity.

TABLE I

| Sample | A | B | C |
|---|---|---|---|
| Moisture (%) | 6.5 | 0.5 | 2.8 |
| Lipid (%) | 0.06 | 0.1 | 0.1 |
| Protein (%) | 0.04 | 0.06 | 0.05 |
| Ash (%) | 0.16 | 0.13 | 0.12 |
| Molar Substitution | 0.71 | 0.70 | 0.71 |
| Viscosity (cp) | 120 | 200 | 110 |
| Colour of dry product | white | pale yellow | pale brown |

The properties mentioned above were measured as follows:

Moisture contents of samples were measured by the weight loss on heating for 16 hours at 100° C at normal atmospheric pressure.

Lipid material present in the starch was determined by pertroleum-ether (b.p. 40°–60° C) extraction, without prior acid hydrolysis of the starch.

Protein content of the starch was calculated as (5.7 × % of nitrogen); nitrogenous material being assayed by a standard Kjeldhal analysis.

Ash content, that is inorganic impurities, were estimated from the weight of residue after a standard incineration procedure at 600° C.

Molar substitution of the hydroxyethylated starch was measured by the method of Lortz, *Anal. Chem.*, 28 (1956), 892.

Viscosity was measured on a 35% w/v aqueous solution at 25° C using a Brookfield rotational viscometer.

The effectiveness of high and low viscosity hydroxyethyl starch produced in accordance with the invention, samples D and A respectively, as a cryoprotective agent is shown in Table 2 below in comparison with that of samples of commercially available hydroxyethyl starch.

TABLE II

| Sample[1] | Viscosity type[2] | Red Cell Recovery[3] | Saline Stability[4] |
|---|---|---|---|
| D | High | 94.2 | 84 |
| Comm. | High | 94.7 | 86 |
| A | Low | 97.2 | 89 |
| Comm. | Low | 96.4 | 86 |

[1]Comm = commercial material.
[2]Brookfield viscosity of 30% w/v aqueous solution at 20° C; High = 180 – 200 cp; low = 85 – 95 cp.
[3]Percentage of red cells recovered after a complete freeze-thaw process.
[4]Percentage of red cells stable in normal saline after a complete freeze-thaw cycle.

In view of the above disclosure it can be seen that hydroxyalkyl starch derivatives produced according to the present invention are comparable in pharmalogical properties to the commercially available product, but can be more easily and economically prepared by utilizing the process disclosed herein.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A process of preparing a substantially inorganic salt free, colorless, pharmacologically active hydroxyalkyl starch which comprises:
   a. subjecting a waxy starch composed principally of amylopectin and little or no amylose to acid hydrolysis at a temperature below the gelatinization temperature of the starch to effect a molecular size reduction while substantially retaining the granular form of the starch;
   b. reacting the hydrolyzed, granular starch with a reducing agent to reduce aldehydic reducing end groups of the hydrolyzed strach to the corresponding alcohol groups under reaction conditions which prevent the dissolution of the granular starch;
   c. suspending the stabilized, hydrolyzed, granular starch in a liquid medium comprising a water-miscible organic solvent, the hydrolyzed, granular starch being substantially insoluble in the liquid medium;
   d. reacting the stabilized, hydrolyzed, granular starch in suspension with a starch hydroxyalkylating agent under basic pH conditions, until a hydroxyalkylated granular starch having a molecular substitution within the range from about 0.3 to about 0.9 is obtained; and
   e. washing the hydroxyalkylated granular starch to obtain a substantially inorganic salt free, colorless, pharmacologically active hydroxyalkyl starch.

2. The process of claim 1 wherein the reducing agent is sodium borohydride.

3. The process of claim 1 wherein the liquid medium additionally contains a minor amount of water.

4. The process of claim 3 wherein the water-miscible organic solvent is isopropanol.

5. The process of claim 1 wherein the basic pH conditions are provided by adding to the liquid medium an inorganic alkali selected from the group consisting of alkali metal hydroxides and alkaline earth metal hydroxides.

6. The process of claim 2 wherein the hydroxyalkylating agent is selected from the group consisting of 1,2-epoxy alkanes and halohydrins.

7. The process of claim 5 wherein the hydroxyalkylating agent is ethylene oxide.

8. The process of claim 6 wherein the suspension of the stabilized, hydrolyzed, granular starch in the liquid medium is cooled to a temperature below about 5° C prior to the step of reacting with the starch hydroxyalkylating agent.

9. The process of claim 7 wherein the starch hydroxyalkylating agent is reacted in liquid form with the stabilized hydrolyzed, granular starch suspended in the liquid medium.

10. The pharmacologically active hydroxyalkyl starch produced by the process of claim 1.

* * * * *